United States Patent [19]

Posso

[11] 4,387,864
[45] Jun. 14, 1983

[54] VIDEO CASSETTE

[75] Inventor: Patrick P. Posso, Lausanne, Switzerland

[73] Assignee: Gefitec S.A., Lausanne, Switzerland

[21] Appl. No.: 244,271

[22] Filed: Mar. 16, 1981

[30] Foreign Application Priority Data

Mar. 26, 1980 [FR] France ............................... 80 06756

[51] Int. Cl.³ .......................... G03B 1/04; G11B 15/32
[52] U.S. Cl. ...................................... 242/199; 242/197
[58] Field of Search ........................ 242/194, 197–200; 206/387; 352/74, 78; 360/93, 96.1, 132

[56] References Cited

U.S. PATENT DOCUMENTS

| | | | |
|---|---|---|---|
| 3,802,647 | 4/1974 | Esashi et al. | 242/199 |
| 4,022,401 | 5/1977 | Kishi | 242/198 |
| 4,101,096 | 7/1978 | Oishi et al. | 242/199 |
| 4,174,080 | 11/1979 | Yamada | 242/199 |
| 4,198,014 | 4/1980 | Oishi et al. | 242/199 |

FOREIGN PATENT DOCUMENTS

| | | |
|---|---|---|
| 2610186 | 9/1977 | Fed. Rep. of Germany . |
| 2722639 | 12/1977 | Fed. Rep. of Germany . |
| 1596360 | 7/1970 | France . |
| 2131760 | 11/1972 | France . |
| 2296240 | 7/1976 | France . |

Primary Examiner—Leonard D. Christian
Attorney, Agent, or Firm—Eyre, Mann, Lucas & Just

[57] ABSTRACT

The invention relates to a video cassette comprising two spools with single disk, the respective hubs of which spools are rotatably mounted with the minimum distance possible between their axes of rotation, inside a casing in two parts, so that the said disks partly overlap in projection and are contiguous respectively to the bases of the said casing parts, each base being provided, opposite the disk which it does not touch, with at least one zone projecting in extra thickness from the base in question so that its fixed guiding surface for the magnetic tape extends in the same plane as the internal annular face of the adjacent rotary disk, the said surface being anti-abrasive and entirely slippery, cassette wherein each of said zones is constituted by an independent part molded in self-lubricating and anti-abrasive plastic material, the said part being added on to the corresponding base of the casing and being fixed thereon by non-deformable securing means.

According to the invention, each projecting zone is constituted by an independent part, molded from self-lubricating and antiabrasive plastic material, the said part being added on to the corresponding casing base and fixed thereon by non-deformable fastening means.

4 Claims, 3 Drawing Figures

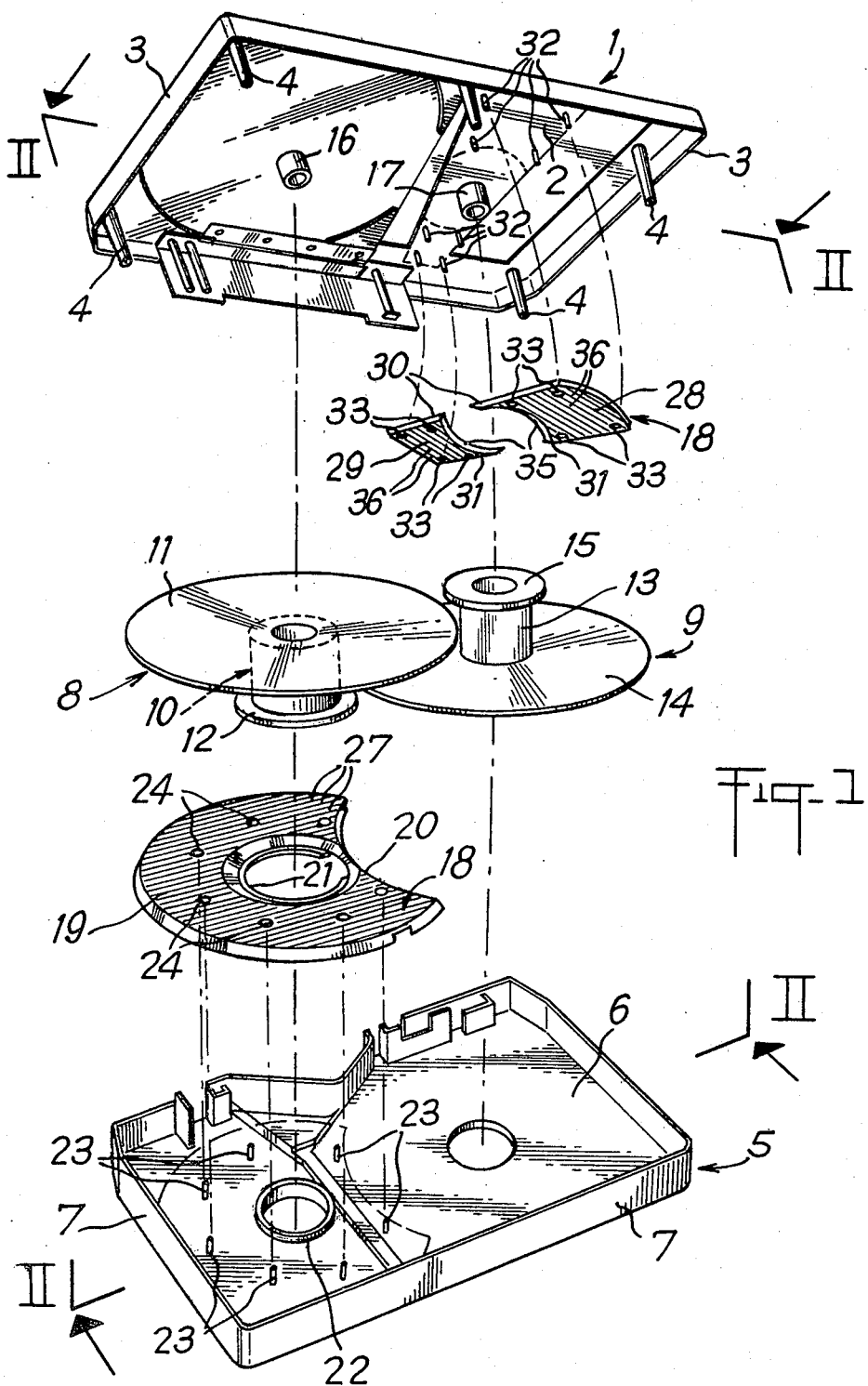
Fig_1

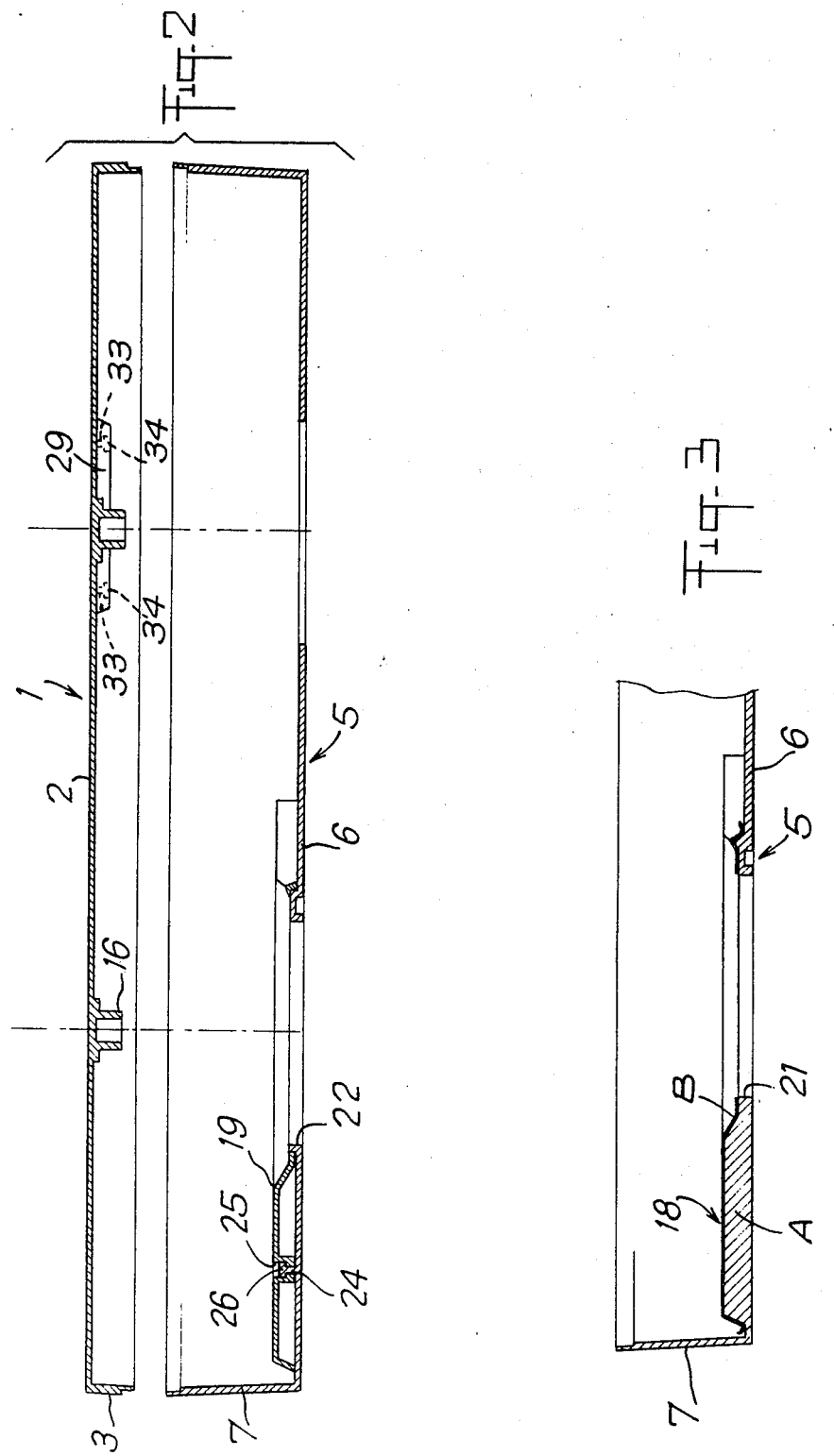

VIDEO CASSETTE

The present invention relates to a video cassette of the type comprising a casing in two parts, inside which are pivotally mounted two spools with only one disk so that it is possible to reduce the distance between their axes to just what is necessary to allow the winding of the magnetic tape on a hub, the said tape unwinding from the other hub and, thus to reduce the overall volume of the cassette. In such a structure the disks are situated respectively close to the bases of two casing parts and obviously overlap in projection. But, for each spool, the magnetic tape would not be guided by the other side of the flange if, in that particular spot, the casing was not equipped with an appropriate means.

According to a known embodiment, the base of each of the two casing parts presents an extra thickness, in the disk-free area, forming a zone of which the fixed surface which guides the magnetic tape is coplanar with the internal annular face of the disk found in the remaining part of the base of the casing in question. Of course, the said surface in contact with which is the corresponding edge of the magnetic tape has to be anti-abrasive and very slippery.

In the said known embodiment, the area in question is molded with the corresponding casing base and is coated with an adhesive film of graphite Teflon which gives it the required superficial properties.

The known cassette described hereinabove has many disadvantages.

The first one resides in the fact that each casing part is an asymmetrical piece of variable thickness. The molds are therefore complex and the molding very difficult to effect if the aim is to obtain a perfectly plane surface for the bases and a very accurate parallelism of the axis of rotation of the spools perpendicularly to the corresponding base, and this is absolutely necessary for the good operation and the reliability of the cassette as well as for the quality of the reproduction and the recording of the sound and image.

A second disadvantage comes from the fact that the adhesive film must be positioned, pulled and placed with great accuracy on the projecting zones. But loosenings can happen with use and the inevitable result is a jamming of the spools and especially damage to the magnetic tape which, as often as not, cannot be saved, not actually for re-using, but rather to retrieve the image and the sound recorded thereon.

Independently of this, the fitting of adhesive films constitutes, and this is a third major disadvantage, a very lengthy, delicate and tedious operation, the result of which is not certain and which is very difficult to automate for mass production.

It is the object of the present invention to overcome the aforesaid disadvantages by proposing that each of the said zones be constituted by an independent part, molded from self-lubricating and antiabrasive plastic material, the said part being added on to the corresponding casing base and fixed thereon by non-deformable fastening means.

Preferably, each molded part is made from polyacetal resin for example a chemically lubricated polyformaldehyde resin, such as that produced and sold by Dupont de Nemours under the name "Delrin CL" or "ZYTEL".

The molded parts are secured on the casing parts in special points and mainly by ultrasonic riveting.

Thus, the bases of the casing are substantially plane and very easy to mold in simplified molds which, nonetheless, permit to reach very great accuracy in the flatness of the sliding surfaces and in the parallelism of the axes of rotation.

Moreover, the parts are very easily and readily fitted. This operation can be automated without any problems and rapidly whilst other assembling operations are in progress.

And also, there is no longer any risk of loosening since the adhesive film is eliminated. Then, the spools can no longer be jammed, the magnetic tape can no longer be damaged, the reliability of the cassette is increased, and the quality of its functioning improved.

The invention will be more readily understood on reading the following description with reference to the accompanying drawings in which:

FIG. 1 is a perspective showing a synoptic view of an improved video cassette according to the invention;

FIG. 2 is a cross-sectional view along the plane II—II of FIG. 1 traversing the axes of rotation of the spools; and FIG. 3 is a partial view similar to that shown in FIG. 2 and illustrating the prior means.

FIG. 1 shows clearly that the casing of the cassette is in two parts 1 and 5, produced separately by injecting a suitable plastic material into a mold.

The upper part 1 has a base 2 which is virtually flat and of constant thickness, integral with a rectangular peripheral border 3 and of positioning pins 4.

The lower part 5 has a base 6 which is virtually flat and of constant thickness, integral with a rectangular peripheral border 7 adapted to come into position on the pins 4 in order to contact the border 3 and to extend it evenly.

The cassette further comprises two spools 8 and 9 designed to receive a magnetic tape, not shown. The spool 8 is provided with a tubular hub 10 which is perfectly cylindrical for winding and unwinding the tape, said hub being integral on one side with a coronal disk 11 and, on the other side, with a slightly projecting flange 12. Likewise, the spool 9 is provided with a tubular hub 13, which is perfectly cylindrical for unwinding and winding the tape respectively, the said hub being integral, on the side of the flange 12 with a disk 14, and on the side of the disk 11, with a flange 15.

When the spools 8 and 9 are housed inside the casing, their hubs 10 and 13 are loosely mounted around tubular sleeves 16 and 17 respectively, molded together with the base 2 of the upper part of the casing 1 and exactly perpendicular to said base, therefore very accurately parallel together, due in particular to the flatness of the said base, whereas the disk 14 of the spool 9 is contiguous to the base 6 which faces the base 2.

But in the crude state of the casing described hereinabove, the magnetic tape which is wound around the hub 13 of the spool 9 does not touch the base 2 and the one which is wound around the hub 10 of the spool 8 does not touch the base 6. The problem is therefore to guide the edge of these tape windings in those particular spots.

According to the prior art described in the foregoing and partly illustrated in FIG. 3, each base 2 or 6 is provided with an extra thickness in those zones A coated with an adhesive film B in graphite Teflon priorly cut according to an outline permitting to cover up the areas in question, to project therefrom, and to come to rest on the surrounding part of the corresponding base. The film B defines a fixed surface 18 for guiding the conjugate winding of the magnetic tape, and to this effect, the surface 18 is coplanar with the internal annular face of the spool disk which is contiguous to the base to which is associated the surface 18.

According to the invention, the bases present, in the aforesaid spots, the same thickness as they have opposite the disks; but in order to reach the level of the internal annular faces of said disks, the said casing bases are integral in the said spots with molded parts having the same, if not better, properties as the film B.

For example, the added-on parts, described hereinafter, are made from a moldable plastic material, which is self-lubricating to help the sliding of the tape, and anti-abrasive to preserve said tape. Each molded part is a polyacetal resin such as a chemically lubricated polyformaldehyde resin. For example, each part can be made from the plastic material produced and sold by Dupont de Nemours under the name "DELRIN CL" or "ZYTEL".

Opposite the spool 8, the base of the casing 6 is integral with a coronal part 19 (FIG. 1) truncated by an arc of circle 20 to allow the free passage of the disk 14 of the spool 9. The bevelled orifice in the centre of said part fits normally on a ring 22 molded with the said base 6, and centers the flange 12 of the spool 8. In addition, the said part 19 is joined to the said base 6 by means of protruding studs 23, numbering 7 in the illustrated example, which studs are also molded with the base, traversing holes 24 provided in said part (FIGS. 1 and 2) and set by ultrasonic riveting into recesses 25 of said holes so as to form holding heads 26. Finally, the guiding surface 18 of the part 19 is preferably grooved and its grooves 27 can be parallel together as well as to the line joining the axes of rotation of the spools.

Similarly, where the principle is concerned, the base 2 of the casing is integral, opposite the spool 9, with two parts 28 and 29 extending one from the other and defined by two parallel edges 30, 31 in a circular ring. Said parts are fixed against the base 2 by means of protruding studs 32 numbering four a-piece in the illustrated example. Said studs are molded with the said base 2, traverse holes 33 provided in the parts 28, 29 and are set, by ultrasonic riveting in recesses (FIG. 2) of said holes to form supported holding heads. The arcs 35 in the centre of the said parts define an orifice inside which fits the flange 15 of the spool 9. Moreover, the guiding surface 18 for the magnetic tape is constituted by grooves 36 molded with the parts 28, 29; said grooves are advantageously parallel together and preferably also the line joining the axes of rotation.

Finally the two parts 1 and 5 of the casing comprises, in known manner and without this interfering with the invention, projecting elements molded therewith which participate, whether directly or through added-on members, to guiding the magnetic tape as well as to the reading, the recording and the erasing of signals.

The invention is not limited to the detailed description given hereinabove, but on the contrary covers any modifications that can be made thereto without departing from its scope.

What is claimed is:

1. A video cassette structure comprising a casing; two spools, each spool having a hub and a single disk thereon, said hubs being rotatably mounted on said casing and positioned to enable substantially the minimum possible distance between the axes of rotation of said spools, said disks being respectively contiguous to a first and second base of said casing; first and second molded parts of polyacetal resin respectively fixed to said first and second bases opposite the non-contiguous disk by non-deformable securing means, each said molded part projecting from its base toward the non-contiguous disk and forming a fixed guiding surface extending in the same plane as the internal face of the contiguous disk on said base.

2. The video cassette structure of claim 1 wherein said molded parts are made of chemically lubricated polyformaldehyde resin.

3. The video cassette structure of claim 1 wherein the guiding surfaces of said molded parts are grooved.

4. The video cassette structure of claim 1 wherein the molded parts are secured to the bases by ultrasonic riveting.

* * * * *